US007502863B2

(12) United States Patent
Sugihara et al.

(10) Patent No.: US 7,502,863 B2
(45) Date of Patent: Mar. 10, 2009

(54) METHOD OF DISTRIBUTING STREAM DATA AND SYSTEM THEREOF

(75) Inventors: Ryo Sugihara, San Diego, CA (US); Ken Masumitsu, Yamato (JP); Shuichi Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 11/253,857

(22) Filed: Oct. 19, 2005

(65) Prior Publication Data

US 2006/0168293 A1 Jul. 27, 2006

(30) Foreign Application Priority Data

Oct. 19, 2004 (JP) ............................. 2004-304443

(51) Int. Cl.
*G06F 15/16* (2006.01)
(52) U.S. Cl. ...................................... 709/231; 709/223
(58) Field of Classification Search ........................ None
See application file for complete search history.

(56) References Cited

FOREIGN PATENT DOCUMENTS

| JP | 2002-314602 | 10/2002 |
|---|---|---|
| JP | 2003-030341 | 1/2003 |
| JP | 2004/070712 A2 | 3/2004 |
| JP | 2004-080145 | 3/2004 |
| JP | 2004-133877 | 4/2004 |
| WO | WO 03/105421 | 12/2003 |
| WO | WO 2004/077785 | 9/2004 |

*Primary Examiner*—Bunjob Jaroenchonwanit
*Assistant Examiner*—Julian Chang
(74) *Attorney, Agent, or Firm*—Richard Goldman; Shimokaji & Associates, PC

(57) ABSTRACT

A method and system which improves reliability and availability of services for streaming distributions in general. A partition server and a plurality of distribution servers are provided in order to distribute stream data to one or more receivers connected together via a network. The partition server receives the stream data and the plurality of distribution servers receive respective elements of the stream data partitioned by the partition server to distribute the elements to the receivers. First, the partition server selects one of the distribution servers that can perform transmissions in order to transmit elements of the stream data received from a streaming source, to the selected distribution server. The distribution server distributes the elements of the stream data received from the partition server, to the receivers. Finally, each receiver reconstructs the original stream data from the elements of the stream data received from the plurality of distribution servers.

1 Claim, 6 Drawing Sheets

[Figure 1]
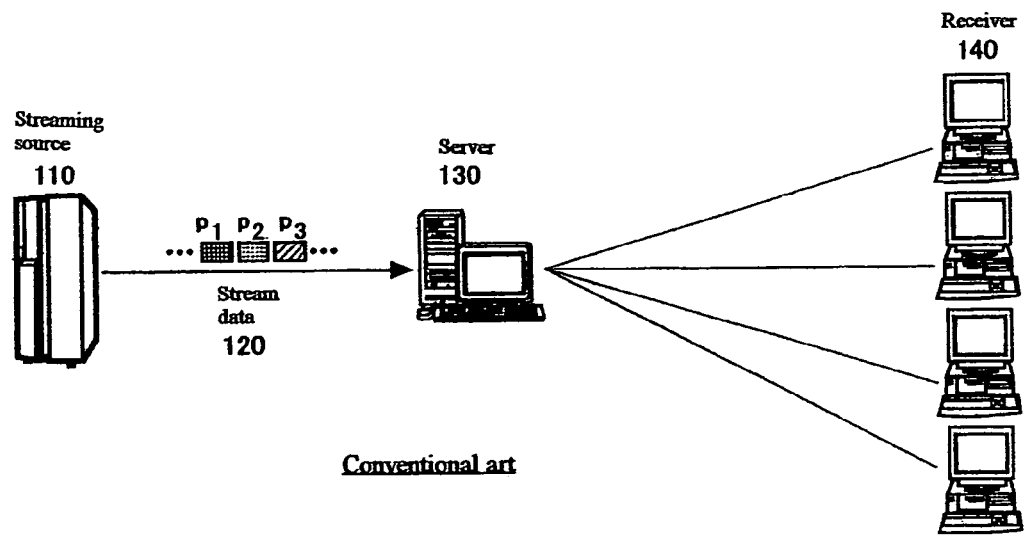
[Figure 2]
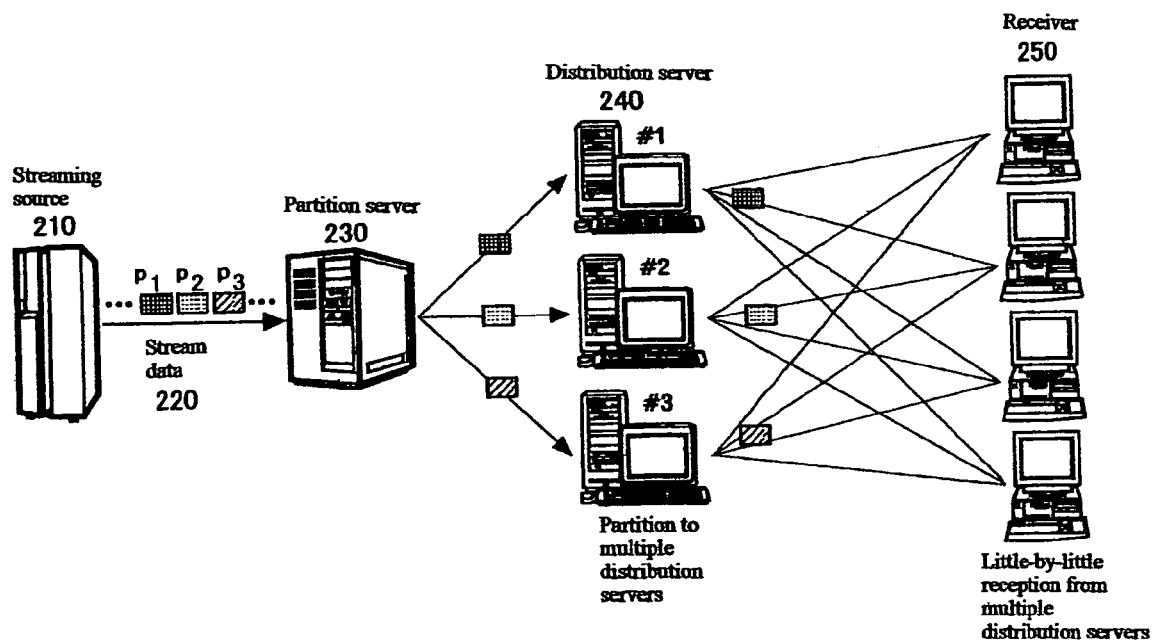

[Figure 3]
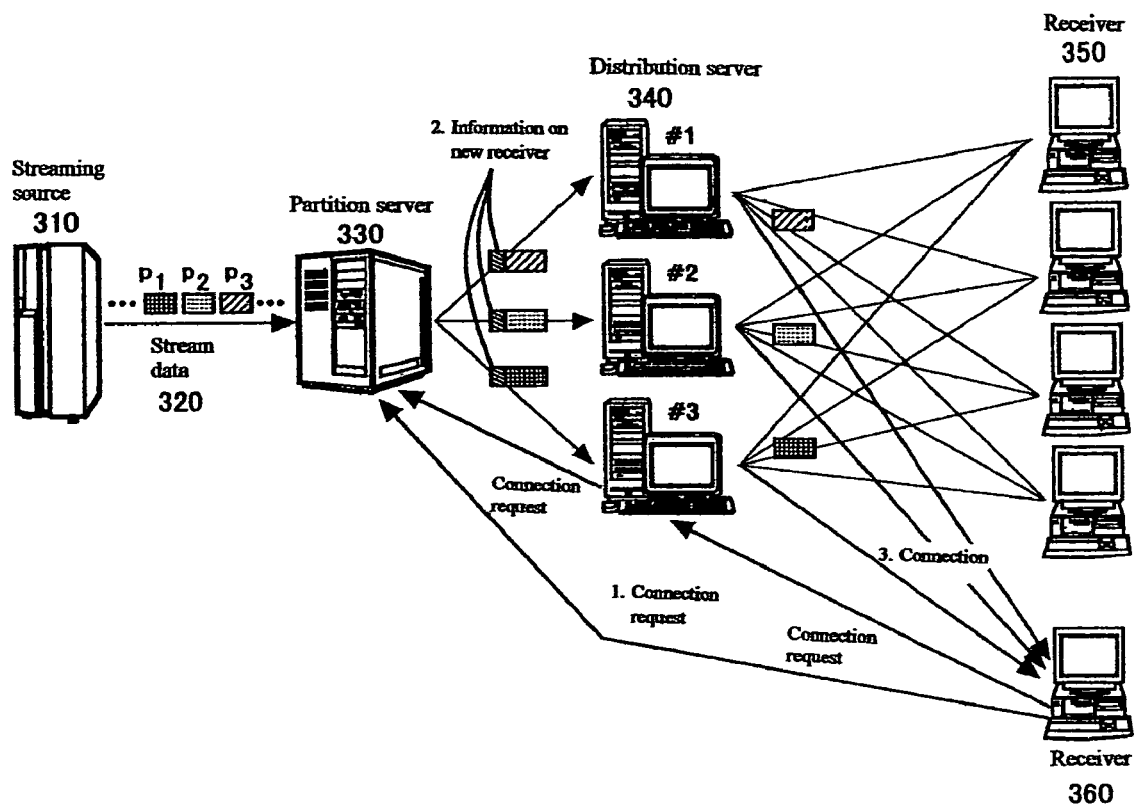

[Figure 4]
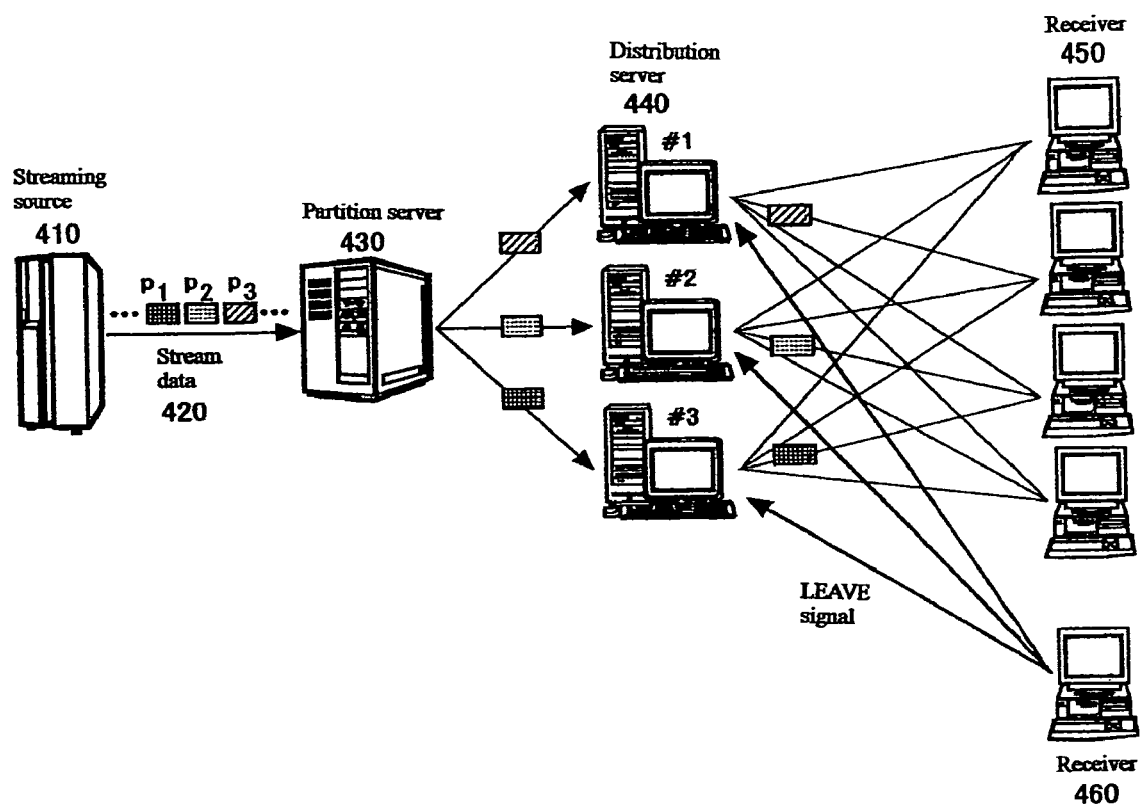

[Figure 5]
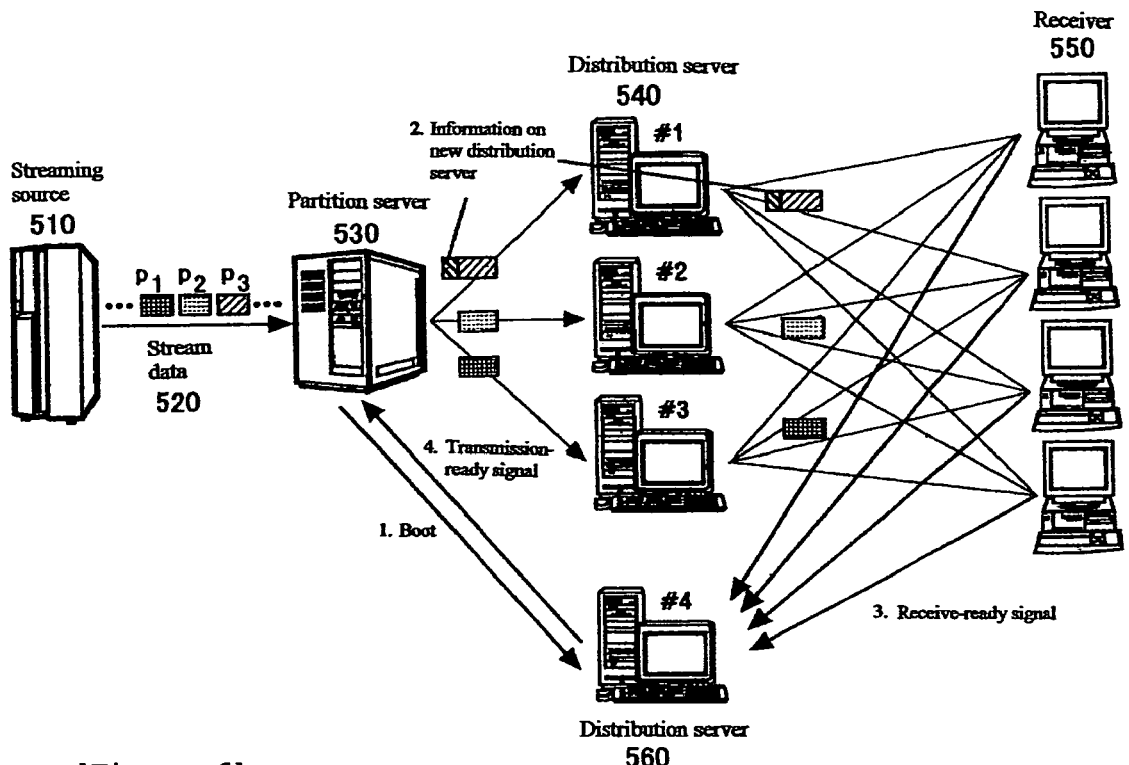
[Figure 6]
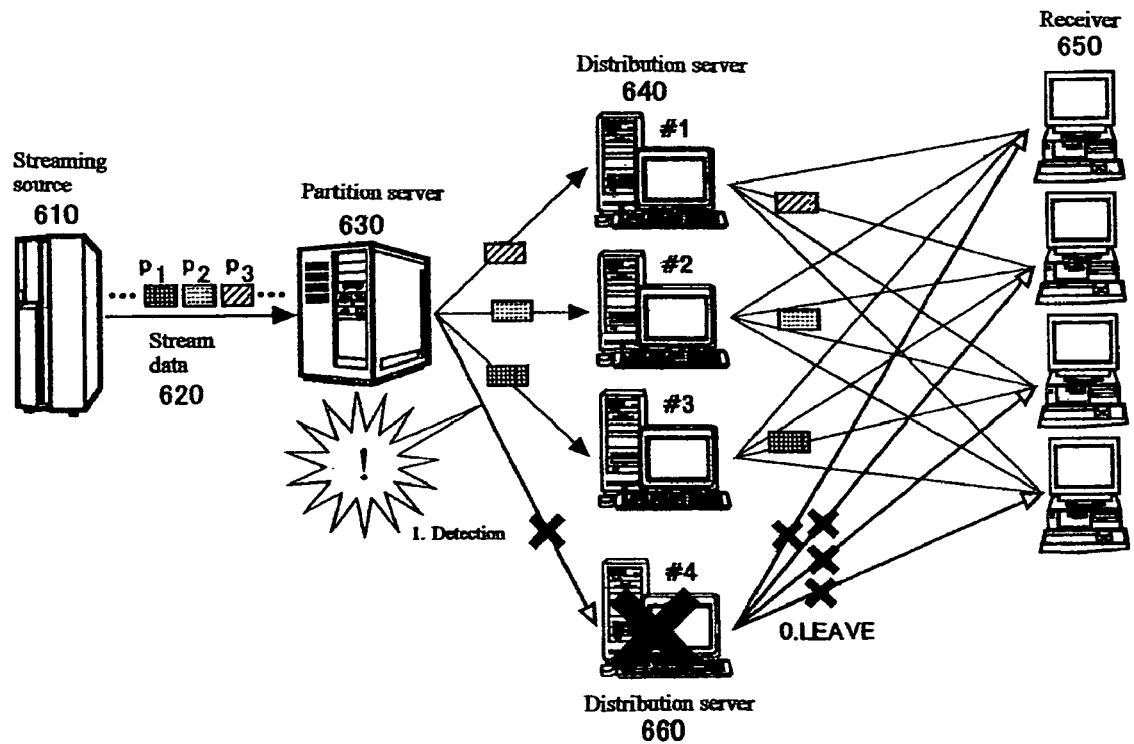

[Figure 7]
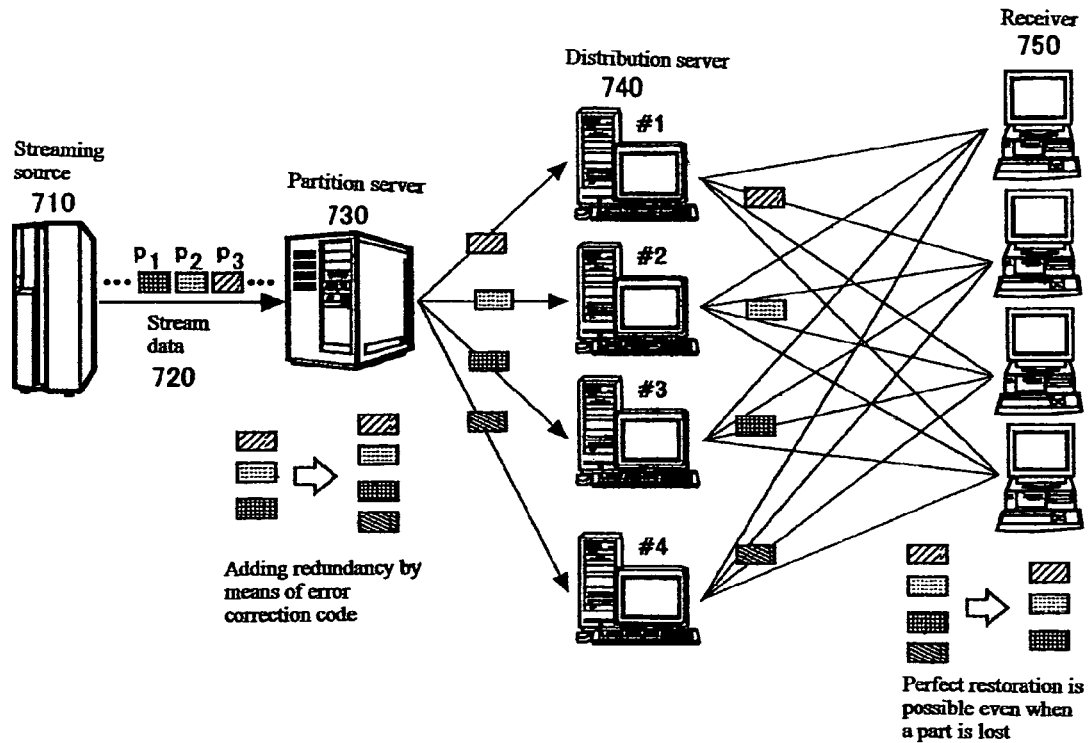
[Figure 8]
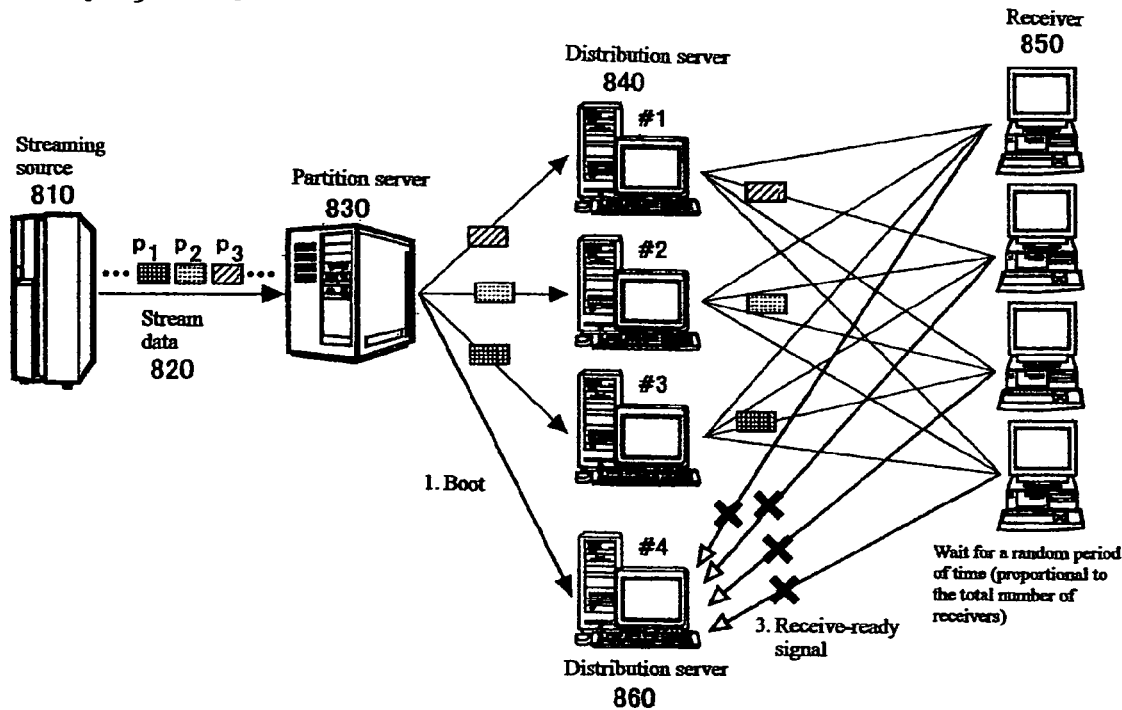

[Figure 9]
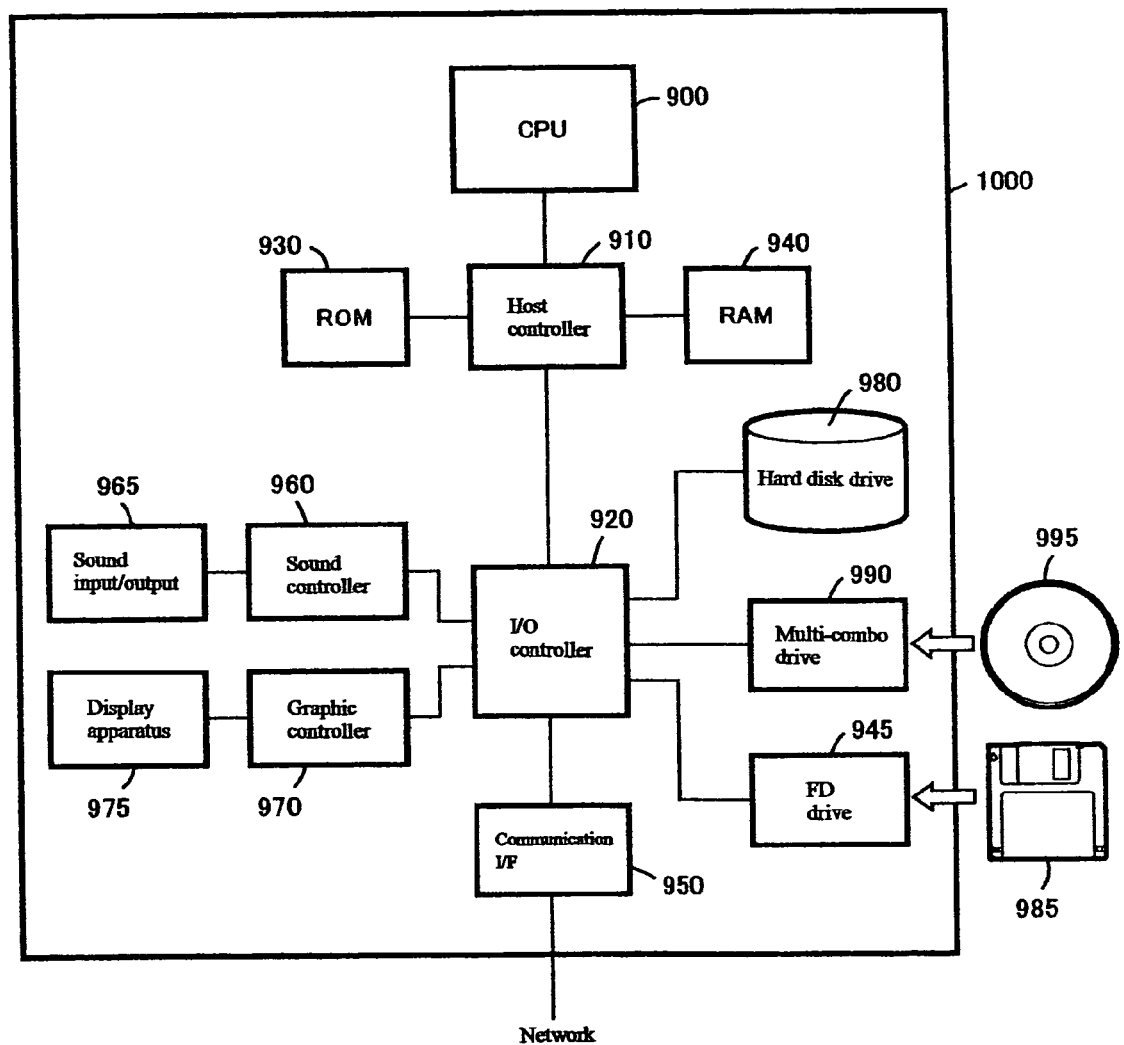

METHOD OF DISTRIBUTING STREAM DATA AND SYSTEM THEREOF

BACKGROUND

1. Field of the Invention

The present invention relates to a method of distributing stream data and system thereof, and more particularly to a flexible method of distributing stream data which copes with the increase and decrease of servers and receivers.

2. Background Art

Streaming distribution services allowing a wide range of users to view stream data generated in real time are attracting great attention. A typical example of conventional streaming distribution is shown in FIG. 1. A server 130 receives stream data 120 outputted from a streaming source 110 and transmits the data to each receiver 140 being a user. However, there has hitherto been no appropriate technique of improving reliability and availability in such streaming distribution. Meanwhile, in the field of data distribution which handles data whose transmission size is preliminarily known, as a technique of making a server redundant each server distributes divided data in order to improve reliability. This technique has been known and disclosed in Published Unexamined Patent Application No. 2004-70712, and so on. This method, which presupposes that each distribution server holds the same distribution data, is not easily applicable to variable-size stream data generated in real time. Moreover, the distribution may be interrupted due to a reconnection to a reserved server upon a trouble during a streaming distribution. Furthermore, in the addition of a reserved server, such processing as pre-providing a server list to a reproduction side are needed, thus making it difficult to change flexibly the server configuration.

To solve the above described technical problems, the objectives of the present invention are as follows:

- To provide a method and system which improves reliability and availability in general services for performing variable-size streaming distributions;
- To provide a method and system which distributes data to receivers without interrupting the streaming service upon a trouble of server;
- To provide a method and system for streaming distribution which flexibly copes with the increase and decrease of receivers;
- To provide a method and system which, in using servers for streaming distribution redundant, does not create an extra load on a particular server;
- To provide a method and system which, in using redundant servers for streaming distribution, eliminates flexibly a troubled server without affecting the streaming being distributed; and
- To provide a method and system which, in using redundant servers redundant for streaming distribution, easily adds a new server without affecting the streaming being distributed.

SUMMARY OF THE INVENTION

To accomplish these objectives, a distribution method to which the present invention is applied takes the following procedure. A partition server 230 and a plurality of distribution servers 240 are provided in order to distribute stream data 220 to one or more receivers 250 connected together via a network as shown in FIG. 2; the partition server 230 receives the stream data 220 and the plurality of distribution servers 240 receive respective elements of the stream data 220 partitioned by the partition server 230 to distribute the elements to the receivers 250. First, the partition server 230 selects one of the distribution servers 240 that can perform transmissions to transmit elements of the stream data 220 received from a streaming source 210, to this distribution server 240. The distribution server 240 distributes the elements of the stream data 220 received from the partition server 230, to the receivers 250. Finally, each receiver 250 reconstructs the original stream data from the elements of the stream data 220 received from the plurality of distribution servers 240. In this case, the elements of the stream data 220 may be packets contained in the stream data.

As is apparent from the above described configuration, the distribution server according to the present invention employs not a server configuration that is based on the relationship between a master and a slave, such as one employed in conventional data distributions, but a server configuration in which each distribution server is equivalent to each other. Shared load for each distribution server can be flexibly decided by the partition server. It is noted that, in the above described outlines of the invention, all essential features of the invention are not listed. Subcombinations of these feature groups can also become an invention.

With the conventional technique of making a distribution server redundant, the distribution can be interrupted due to a reconnection to a reserved server upon a trouble during a streaming distribution. Further, since a server list is pre-provided to a reproduction side, it is difficult to dynamically perform server additions. In contrast, according to the present invention, a server that distributes data to receivers employs a server configuration that is not based on the relationship between a master and a slave such as a main server and a subserver. Consequently, the configuration can be flexibly changed to prevent the distribution from being interrupted upon a trouble. Moreover, the receiver does not need to take action such as reconnection. Further, additional information on control or the like can be attached to stream data before transmission. This minimizes possible overheads associated with the redundant server. It is thus also possible to for example, flexibly change the server configuration in accordance with the level of reliability required by a service provider carrying out distributions. This increases the number of choices in the application of streaming distributions.

BRIEF DESCRIPTION OF THE DRAWINGS

FIG. 1 illustrates a conventional method of distributing streaming data;

FIG. 2 illustrates a method of distributing streaming data according to the present invention;

FIG. 3 illustrates a method for a receiver 360 to newly participate;

FIG. 4 illustrates a method for a receiver 460 to leave;

FIG. 5 illustrates a method of adding a distribution server 560;

FIG. 6 illustrates a method for a distribution server 560 to leave;

FIG. 7 illustrates an embodiment in which an error correction code is applied to the present invention;

FIG. 8 illustrates an embodiment in which connection concentration observed when a distribution server is added is avoided; and FIG. 9 illustrates an exemplary hardware configuration of servers and receiver terminals used in the present invention.

DETAILED DESCRIPTION OF THE INVENTION

Referring to FIG. 2, a streaming source (streaming server) 210 creates stream data 220, which is received by a partition server 230 newly introduced according to the present invention. The partition server 230 transfers the received stream data 230 to a distribution server 240; when there are multiple distribution servers, the stream data is partitioned before transmission. The method of partition is such that one distribution server is selected from among the distribution servers 240 that can perform transmissions at this time. According to an example, by defining a packet as an element of stream data, a selection may be randomly made for each packet from among the distribution servers 240 that can perform transmissions at this time. According to another example, the partition server 230 may hold a transmission queue for each distribution server 240, by which the partition server 230 sends a packet to a distribution server whose transmission queue is smallest (i.e., whose transmission is most smoothly performed). It is noted that hereinafter, an element of stream data is sometimes simply referred to as data, packet or data packet.

A receiver 250 receives data from all of the distribution servers 240. The received data packets are rearranged on a buffer incorporated into the receiver 250, so that the stream is restored to the original order. The restored stream data is read into a reproduction application.

Addition or removal of a receiver. FIG. 3 illustrates a method for a receiver 360 to newly participate. A method for the receiver 360 to newly participate will be described below. There are two methods: (1) the new server 360 directly requests a connection to a partition server 330; and (2) the new receiver requests the connection to the partition server 330 via a distribution server 340. Either configuration may be employed. When receiving a connection request from the new receiver 360, the partition server 330 transmits a list of distribution servers to the new receiver 360. Based on the contents of the list, the new receiver 360 transmits a receive-ready signal to each distribution server 340. The list of distribution servers may include a list of information enabling connection to each distribution server, or alternatively may include a table containing network address (such as IP address). According to another embodiment, when receiving a connection request, the partition server 330 attaches "information on new receiver" to stream data 320 (i.e., piggybacking) to provide the attached data to all the distribution servers 340. The "information on new receiver" includes information enabling connection to the distribution server, for example, a combination of IP address and port number. The information is attached to the stream data before transmission, thus enabling an efficient notification of information. When receiving the information, all the distribution servers 340 connect with the new receiver 360 to initiate the distribution.

FIG. 4 illustrates a method for a receiver 460 to leave. A receiver may leave from all the distribution servers 440 according to a common procedure employed when a client leaves from a server in data communication. A leave signal ("LEAVE") may be transmitted to the distribution servers 440, for example. Alternatively, the distribution servers 440 may be forcibly disconnected. Preferably, the distribution servers 440 are disconnected after some signal is sent to the distribution servers 440. The partition server 430 does not participate at all during these procedures.

Increase and decrease of a distribution server. FIG. 5 illustrates a method of adding a distribution server 560 while the service is going on. As examples, there is a case in which a new distribution server 560 is network-booted by a partition server 530, or a case in which a new distribution server 560 is first booted and then connected to a partition server 530. In the former case, the partition server 530 immediately performs a data partition to the new distribution server 560. In the latter case, the partition server 530 does not immediately perform a data partition to the new distribution server 560; data is firstly sent only to the existing distribution servers 540, and after the new distribution server 560 is booted, the partition server 530 provides "information on new distribution server" to any one of the existing distribution servers 540. Specifically, "information on new distribution server" is a small amount of data containing a combination of the IP address and port number of the new distribution server 560, which information is attached to stream data packets before transmission, thus implementing an efficient notification of information. The distribution server receiving the information on new distribution server transfers the information to all receivers 550 via a distribution network. When receiving the information on new distribution server, each of the receivers 550 connects with the new distribution server 560. The new distribution server 560 may send a transmission-ready signal to the partition server 530 at the time when the connection with all the receivers 550 is completed, or at the time when the connection with one receiver is completed. At this time, the partition server 530 also sends data to the new distribution server 560.

FIG. 6 illustrates an embodiment in which a distribution server is deliberately made to leave, or a distribution server cannot operate normally due to a trouble. When detecting the leaving or trouble of a distribution server 660, the partition server 630 stops the data partition to the distribution server 660 which has been left. Methods for the partition server 630 to detect that a distribution server has left or has a trouble includes, for example, a case where an acknowledgement (ACK) does not return after the partition server 630 transmits data to the distribution server; a case where the TCP connection is disconnected; a case where a hardware trouble is detected. There is also a case where, as described above, when the partition server holds a transmission queue for each distribution server, the transmission queue for the distribution server which has left or has a trouble is not processed and therefore accumulated. In such a case data ceases to be partitioned to the queue. In any of the methods, the detection of disconnection is rapidly performed so that the data partition can be stopped with a significantly small delay. When detecting the disconnection, the partition server 630 transmits data packets to one server selected from the remaining distribution servers which can perform transmissions. A string of stream data is thus correctly supplied to receivers 650 via the distribution server 640 which normally operates. Specifically, the transmission of stream data is dynamically changed based on the detection of disconnection, thus making it unnecessary for the receiver 650 side to perform an extra processing.

Using redundant servers. In the above described embodiments, it is supposed that the number of partition servers is one. With this configuration, however, distribution can be interrupted when a trouble of partition server occurs. In contrast to a common configuration for streaming distribution where only a single distribution server exists, a partition server performs only part of the distribution function which is divided, and does not hold the state of receivers. For these reasons, it is thought that the load of the partition server is small, and the likelihood of a trouble is low. However, in order to improve reliability, adding redundancy to the partition server is also possible. Specifically, a configuration is employed such that multiple partition servers 230 shown in FIG. 2 are arranged, and between the streaming source 210 and multiple partition servers 230, there is arranged a parent partition server. The relationship between the parent partition server and multiple partition servers is identical to that between the partition server 230 and multiple distribution servers 240 shown in FIG. 2. By further increasing the number of stages of this configuration, reliability can be further improved.

Use of error correction code. FIG. 7 illustrates an embodiment in which an error correction code is applied to the present invention to thereby further improve reliability. When a partition server 730 partitions stream data 720 and transmits each element to distribution servers 740, data obtained by adding redundancy to the original data using an error correction code is transmitted. The distribution servers 740 transmit the received data to receivers 750. The receivers 750 buffer the received data to restore it to the original stream data. In this case, even when part of the data is lost due to the noises of communication line, etc, perfect restoration of data is possible by means of the error correction function of error correction code. In addition to the noises, depending on a method for the partition server 730 to partition data packets to the distribution servers 740, when the distribution server leaves or has a trouble, a slight packet loss can occur. In another case, part of the data transmitted from the partition server 730 may not be distributed correctly to the receivers 750 due to a degraded performance of the distribution server 740 and other reasons. When an error correction code is used in order to cope with the degradation of distribution quality due to packet loss caused by such reasons, reliability can be further improved.

Avoidance of connection concentration. FIG. 8 illustrates an embodiment in which connection concentration occurring when a distribution server is added is avoided. When a new distribution server 860 is booted by a partition server 830 (or firstly a new distribution server 860 starts), the partition server 830 provides "information on new distribution server" to any one of the existing distribution servers 840. Specifically, the "information on new distribution server", attached to stream data before transmission, is a small amount of data having a combination of the IP address and port number of the new distribution server 860. The distribution server that receives the "information on new distribution server" transfers the information to all receivers 850 via a distribution network. When receiving the information on new distribution server, each of the receivers 850 connects with the new distribution server 860. At this time, in a case where the number of receivers 850 is large, a connection concentration to the new distribution server can occur, thus causing a temporary overload on the network. A measure against the overload is that the distribution server attaches information on the total number of receivers 850 to the packet by which the information on new distribution server is provided. Each receiver 850 can thus connect with the new distribution server after waiting for a random period of time proportional to the total number of receivers. For example, if a period of time obtained by multiplying the total number of receivers by 100 ms is a maximum waiting time, the maximum waiting time is 1 second when the total number of receivers is 10. Each receiver decides on a waiting time of 1 second or less based on a random number. The maximum waiting time is 10 seconds when the total number of receivers is 100. In this case, after deciding on a waiting time of 10 seconds or less based on a random number, each receiver waits for the decided period of time, and then starts the connection.

P2G-type data distribution. The distribution servers and receivers shown in FIGS. 2 to 8 can be easily replaced with P2G servers and receivers thereof. While each receiver keeps connection with all distribution servers, a single list of transfer destination with respect to the receivers in P2G is used. Specifically, no matter which server transmits a packet, the receiver transfers the packet using constantly the same method. When a new receiver is added, a partition server provides the information on new receiver to all the distribution servers. In this case, an appropriate distribution server is designated as a representative, and is informed accordingly with a flag on. The distribution server selected as the representative creates a list of transfer destination for the new receiver to transmit it. When a receiver leaves, the receiver transmits a "leave" signal to the P2G server before disconnection, and also disconnects with transfer destination receivers.

Stream data distribution service. The configuration according to the present invention can be easily applied to a stream data distribution service. By taking the configuration shown in FIG. 2 as a typical example, a description will be given. In response to each receiver 250 which is a content user reconstructs the original stream data 220 from the data received from multiple distribution servers 240, the information on each receiver and the information on the reconstructed stream data are transmitted to a partition server via the distribution server. The partition server 230, which doubles as one performing billing management, performs billing according to the information on user receiver and the reconstructed information transmitted from the distribution server 240 or transmitted directly from the receiver 250. Various methods can be used for the billing, such as one based on the size of data reconstructed as reconstructed information, one based on the contents of reconstructed stream data, and one based on the total viewing time after reconstruction.

FIG. 9 illustrates an exemplary hardware configuration of servers and receiver terminals used in the present invention. A computer 1000 includes a CPU peripheral section having a CPU 900, RAM 940, ROM 930 and I/O controller 920 connected to each other via a host controller 910, and a communication interface 950, hard disk drive 980, multi-combo drive 990 capable of reading from and writing into a disk-type medium 995 such as a CD and a DVD, FD drive 945 capable of reading from and writing into a flexible disk 985, sound controller 960 to drive a sound input/output apparatus 965 and graphic controller 970 to drive a display apparatus 975 each connected via the I/O controller 920.

The CPU 900, which operates based on programs stored in a ROM 930, BIOS and RAM 940, controls each section. The graphic controller 970 acquires image data created by the CPU 900, etc. on a frame buffer provided within the RAM 940, and allows the image data to be displayed on the display apparatus 975. Alternatively, the graphic controller 970 may have contained therein the frame buffer for storing the image data created by the CPU 900, etc.

The communication interface 950 communicates with external apparatuses via a network. The communication interface 950 is connected to various servers and receivers according to the present invention via the network. Even when a wired network, wireless network, infrared network, or a short-distance radio network such as BLUETOOTH is employed for the connection, the configuration according to the present application can be used without any change. The hard disk drive 980 stores programs and data used by the computer 1000. The multi-combo drive 990 reads a program or data from the medium 995 such as a CD/DVD. The program and data thus read are loaded into the RAM 940, and are used by the CPU 900. The medium for recording the program according to the present invention can be supplied as these external storage media, or alternatively the program may be supplied from the internal hard disk drive 980, or may be downloaded via the network.

It is noted that the above described configuration is an exemplary hardware configuration used in the present invention, and is not an essential requirement of the present invention. For example, an electrical apparatus having a CPU capable of being connected via a network, such as a mobile terminal, game machine and PDA, can also be used for the present invention.

The previous description is of preferred embodiments for implementing the present invention, and the technical scope of the invention should not be restrictively interpreted by the description of the embodiments. Those skilled in the art will recognize that many changes or modifications to the embodiments described above are possible. It will be apparent from the description of the claims that an embodiment with such changes or modifications applied thereto can also be included in the technical scope of the invention.

We claim:

1. A method of distributing stream data for use with a partition server that receives stream data and a plurality of distribution servers that receives elements of the stream data partitioned by the partition server to distribute the elements to receivers, the method comprising the steps of:

transmitting, by the partition server, a list of the plurality of distribution servers to a new receiver in response to a connection request from the new receiver;

attaching, by the partition server, in response to the connection request from the new receiver, an information on the new receiver to each element of the stream data to provide the new receiver information to the plurality of distribution servers;

transmitting, by the new receiver, a receive-ready signal to the plurality of distribution servers according to the list;

initiating distribution to the new receiver by the plurality of distribution servers in response to receiving the new receiver information and the receive-ready signal;

selecting, by the partition server, one of a plurality of distribution servers that can perform transmissions, wherein the partition server transmits elements of the stream data to the selected distribution server;

monitoring, by the partition server, the operating state of each distribution server;

initiating, by the partition server in response to detecting connection of a newly added distribution server, the partition of elements of the stream data to the newly added distribution server;

transmitting, by the partition server in response to detecting connection of the newly added distribution server, a notice of addition of the newly added distribution server to all the receivers via the distribution servers, the notice of addition being transmitted by the partition server via attaching to the elements of the stream data:
  information on the newly added distribution server to transmit the newly added distribution server information to the distribution servers;
  information on the total number of receivers to the elements of the stream data to transmit the total number of receivers information to the distribution servers;

connecting, by the receivers in response to the notice of addition of the newly added distribution server, with the newly added distribution server after waiting for a period of time proportional to the total number of receivers;

transmitting, by the receivers in response to receiving the notice of addition, the receive-ready signal to the newly added distribution server;

transmitting, by the newly added distribution server in response to receiving the receive-ready signal from the receivers, a transmission-ready signal to the partition server;

initiating, by the partition server in response to receiving the transmission-ready signal, the partition of elements of the stream data to the newly added distribution server;

distributing, by the selected distribution server, the elements of the stream data received from the partition server, to the receivers;

reconstructing, by each of the receivers, the original stream data from the elements of the stream data received from the plurality of distribution servers;

detecting, by the selected distribution server, disconnection of one of the receivers;

terminating, by the selected distribution server, distribution to the disconnected receiver in response to the detection;

dynamically changing, by the partition server in response to detecting disconnection of one of the distribution servers, the transfer destination of the elements of the stream data so that the disconnected distribution server is prevented from being used by the partition server;

determining, by the partition server, whether or not a notice of receipt of the elements of the stream data is received from the distribution servers, wherein the notice of receipt is an ACK of the elements of the stream data received by the distribution servers; and determining, by the partition server in response to not receiving the notice of receipt, that a particular distribution server is disconnected, and preventing the elements of the stream data from being transmitted to the disconnected distribution server.

* * * * *